No. 876,095. PATENTED JAN. 7, 1908.
W. RUPPEL.
FRUIT PRESS.
APPLICATION FILED APR. 24, 1907.
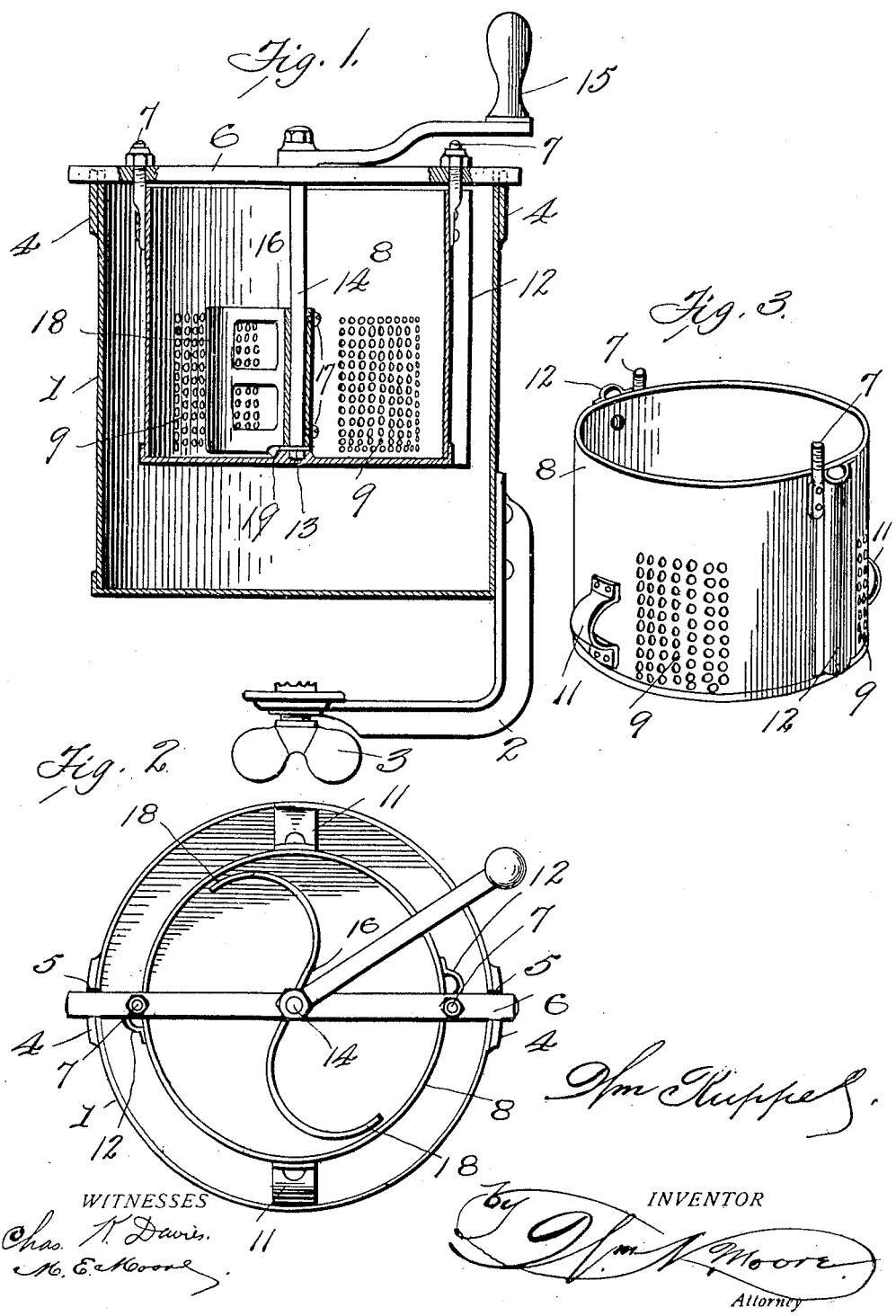
WITNESSES
INVENTOR
Attorney

UNITED STATES PATENT OFFICE.

WILLIAM RUPPEL, OF EVANSTON, WYOMING.

FRUIT-PRESS.

No. 876,095.  Specification of Letters Patent.  Patented Jan. 7, 1908.

Application filed April 24, 1907. Serial No. 369,946.

*To all whom it may concern:*

Be it known that I, WILLIAM RUPPEL, a citizen of the United States, residing at Evanston, in the county of Uinta and State of Wyoming, have invented certain new and useful Improvements in Fruit-Presses, of which the following is a specification.

My invention relates to improvements in fruit-presses, and has for its primary object, the provision of a simple and practical device which will crush or disintegrate the fruit or vegetables in an efficient and thoroughly satisfactory manner.

Another object of my invention is the provision of a combined press and strainer having a removable strainer section so that strainers of different porosity may be interchanged to suit the quality of the fruit or vegetables to be pressed; and a still further object is to provide for the ready disassembling of the parts to facilitate cleaning thereof.

With these and other objects, in view, my invention consists of a containing vessel, a strainer cylinder removably supported therein, and a rotary dasher in said strainer cylinder of a curvature to force the material through the perforations in said cylinder.

The invention further comprises a fruit press and strainer embodying certain other novel features of construction, combination and arrangement of parts substantially as disclosed herein and as illustrated in the accompanying drawings, in which:

Figure 1, is a vertical sectional view of the device showing it clamped in position upon a table or other support. Fig. 2, is a top plan view of the same. Fig. 3, is a detached detail view of the strainer cylinder and support therefor.

In the drawings: The numeral 1, designates the outer or containing vessel which is preferably cylindrical in form and has attached to one of its sides the clamp member 2, which extends down beneath the bottom of the vessel and is provided on its end with a clamping screw 3, adapted to engage the table or other support and securely hold the vessel in position thereon as shown in Fig. 1. Strengthening plates 4, are secured at diametrically opposite points on the edge of the vessel and these plates are formed with a slot or recess 5, therein to receive the supporting bar 6. Suspended from the supporting bar by means of the bolts 7, is the strainer cylinder which consists of a casing 8, provided with a series of perforations 9, on different sides thereof. These openings are formed in the lower portion of the outer casing 8 for the exit of the crushed material from the screen, and brackets 11, are mounted at opposite points on the outside of the screen casing and serve to keep the casing properly spaced from the walls of the containing vessel. Tubes 12, are mounted on the outer walls of the casing, and the lower ends of these tubes are in direct communication with the interior screen so that liquid may be conveniently admitted to the material during the pressing operation. A thrust bearing 13, is mounted on the bottom of the screen casing and journaled between said bearing and the supporting bar is the spindle 14, provided with a crank or operating handle 15, on its upper extended end.

Secured to the spindle is a dasher which is preferably made in one continuous piece of sheet metal comprising the straight body portion 16, which is secured to the spindle by screws or other suitable fastenings 17, the body portion being curved into flaring oppositely disposed crushing terminals 18. The crushing ends of the dasher are in the form of a gradual rearwardly directed curve, the extreme ends of the dasher making close contact with the screen, so that the material to be crushed is gradually wedged against the walls of the screen and forced through the perforations therein. The dasher extends up past the exit openings in the screen casing so that considerable material may be crushed at one time and the lower edge of the dasher scrapes the bottom of the casing, a cut away portion 19, being provided on the lower edge of the dasher so as to escape the lower bearing for the spindle.

The fruit or the vegetables to be crushed and strained are placed in the screen casing and as the dasher is rotated, the flaring ends of the dasher cause the material to be wedged between the ends of the dasher and the screen and the material is thus forced out through the exit openings in the screen casing into the outer vessel. When it is desired to crush the material either finer or coarser, strainer cylinders of different mesh may be inserted in the containing vessel as will readily be understood.

From the foregoing description taken in connection with the drawings, the many advantages and usefulness of my fruit press will be readily appreciated and it will be apparent that I have produced all the results herein set forth as the objects of my invention.

I claim:

1. In a fruit and vegetable press, the combination with a cylindrical containing vessel and a supporting bar engaged on the rim thereof, of a cylindrical casing suspended therein from said bar and provided with perforations in its walls, means for properly spacng the perforated casing in the containing vessel, a spindle journaled in the casing, and a dasher carried by said spindle.

2. A fruit and vegetable press comprising a cylindrical containing vessel, a cylindrical casing suspended therein and provided with perforations, brackets on the sides of the casing to properly space it from the walls of the containing vessel, a spindle journaled in the casing, and a dasher carried by said spindle, said dasher having oppositely curved blades and tubes mounted on the walls of the perforated casing in communication with the casing.

3. A fruit and vegetable press comprising a containing vessel, a supporting bar secured to the rim of said vessel, a casing suspended from said supporting bar and provided with perforations, brackets on the casing to hold the same spaced from the containing vessel a spindle journaled between the bottom of the casing and the supporting bar, and a dasher carried by the spindle having oppositely curved blades to engage the walls of the casing.

In testimony whereof I affix my signature in presence of two witnesses.

WILLIAM RUPPEL

Witnesses:
   JOHN B. MCNEIL,
   JOHN RAFFERTY.